Patented Sept. 4, 1951

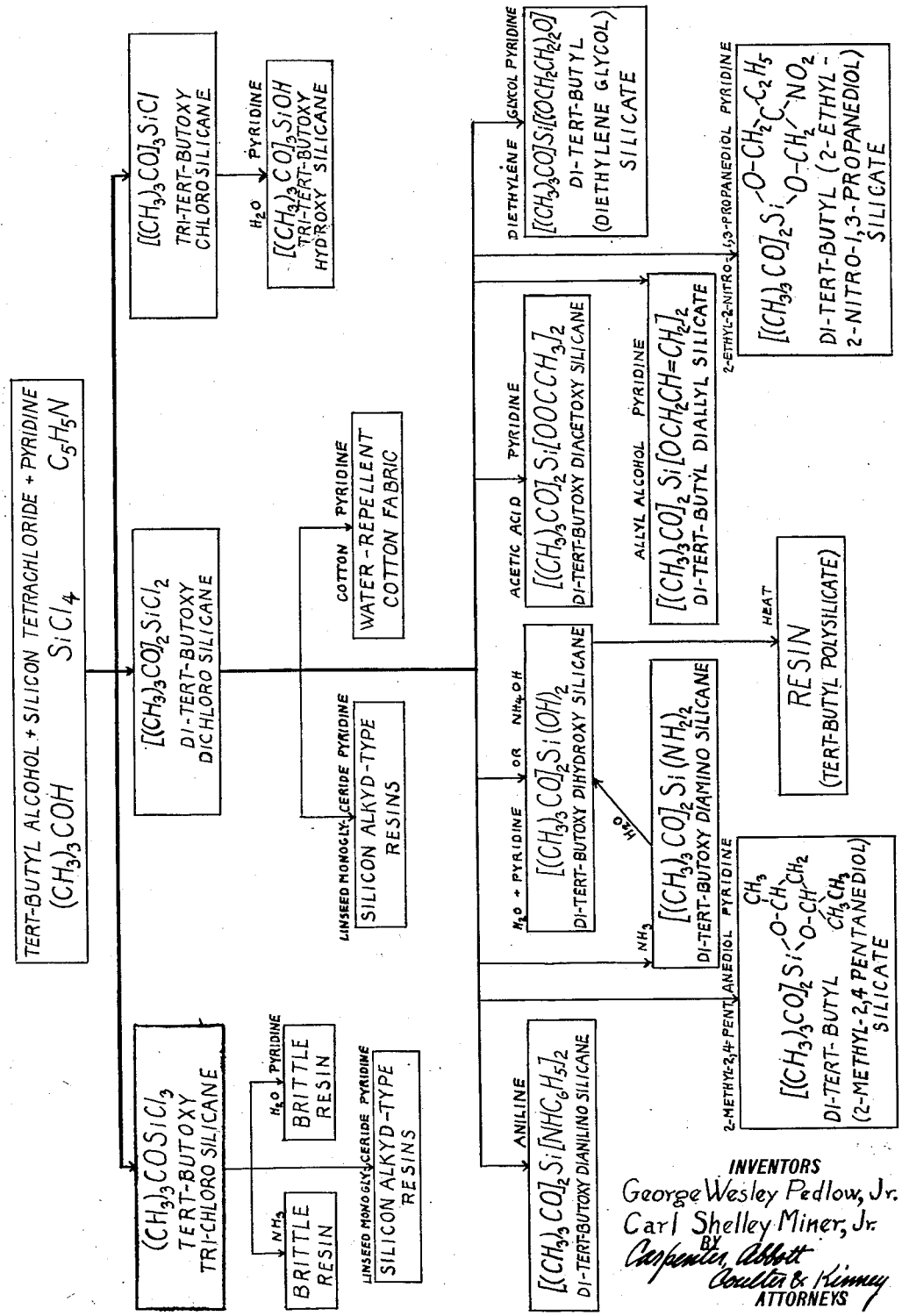

2,566,956

UNITED STATES PATENT OFFICE 2,566,956

TERTIARY-ALKOXY CHLOROSILANES

George Wesley Pedlow, Jr., and Carl Shelley Miner, Jr., Evanston, Ill., assignors to Minnesota Mining & Manufacturing Company, St. Paul, Minn., a corporation of Delaware Application December 31, 1942, Serial No. 470,904

1 Claim. (Cl. 260—448.8)

The present invention relates to organic silicon compounds and to products or articles involving the same, and to methods for producing such compounds.

Certain of the organic silicon compounds in question may be regarded as silicon tetrachloride, $SiCl_4$ (which is derivable from silica, $SiO_2$), in which at least one of the chlorine atoms is replaced by an organic radical, particularly an alkoxy radical, yielding compounds such as $(RO)_2SiCl_2$ and where the compounds in question have certain special properties and novel characteristics and/or are adapted for new and valuable uses. The invention as a whole will be more fully explained hereinafter.

Heretofore others have produced certain organic silicon containing products, starting with silicon tetrachloride, $SiCl_4$. Silicon tetrachloride is a chemical product which has long been known. It can readily be produced in different ways including, by blowing chlorine through a tower packed with sand and coke and of controlled temperature and other conditions. Thus silicon tetrachloride is a readily available material.

One material which has been known for quite some time, and which is derivable from silicon tetrachloride, is ethyl orthosilicate, i. e.

$(C_2H_5O)_4Si$ which may also be referred to as tetra-ethoxy-silicane. This can be produced by the reaction of silicon tetrachloride and ethyl alcohol under certain conditions, so that the ethoxy radical replaces the chlorine and HCl is evolved. This reaction has not proved too difficult because the hydrogen chloride does not react readily with ethyl alcohol. In fact, HCl does not react readily with primary alcohols in general.

However hydrogen chloride is quite reactive with other alcohols; and this fact has interfered with the production of interaction products of silicon tetrachloride and alcohols, except for primary alcohols. For example, see "Alkyl Orthosilicates" by A. W. Dearing and E. Emmet Reid, Journal American Chemical Society, vol. 50, 1928, page 3058: The writers tried one secondary alcohol, i. e. isopropyl alcohol, but were unable to produce an alkyl silicate of any kind this way; so they otherwise employed only primary alcohols in their work. Alcohols other than primary alcohols have a natural tendency to form the corresponding alkyl chloride and $SiO_2$ when it is attempted to react such an alcohol with silicon tetrachloride.

Other procedures have been employed in attempts to produce certain so-called organic silicon-containing compounds.

One such procedure (which has advantages for certain purposes) involves the use of the Grignard reagent. For example, as a general illustration, note Eugene G. Rochow Patent No. 2,258,218.

It will be noted that this procedure does not yield an alkoxy silicane, nor an alkoxy chloro silicane; rather it yields an alkyl silicane or an alkyl chloro silicane, such as:

in which the carbon atom of the alkyl group (or of an aryl group) is joined directly to the silicon atom; whereas in alkoxy silicon compounds there is an oxygen atom intervening between the carbon atom of the alkyl group and the silicon atom, which materially alters the nature of the product. Further, the Grignard reaction is very expensive and hence unsuitable for ordinary large scale commercial operations, at least in many cases and, in fact, in most cases unless magnesium becomes much cheaper. This reaction also involves the use of large volumes of anhydrous ether, which is not only expensive but is hazardous and difficult to handle.

Another procedure which has been tried is the Wurtz Reaction, an ordinary application of which is:

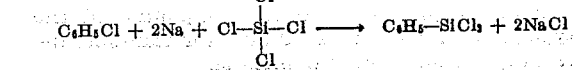

That is, phenyl chloride (otherwise known as chloro benzene) plus silicon tetrachloride plus sodium will (to some extent) tend to yield phenyl trichloro silicane plus sodium chloride.

However this reaction, where it is desired to replace part of the chlorine atoms of silicon tetrachloride with phenyl or other aryl or alkyl groups, tends to result in a mixture of all possible phenyl or other aryl or alkyl substituted silicanes. There is also a tendency for the phenyl chloride, or equivalent, in the presence of sodium, to produce diphenyl, or equivalent, which further detracts from the practical worth of such a process. For example, in endeavoring to produce $Ph_2SiCl_2$, i. e. diphenyl, dichloro silicane, we have found that it is difficult to secure a yield better than 15-20 percent.

The Friedel-Crafts type of reaction may also be considered. A typical Friedel-Crafts reaction is:

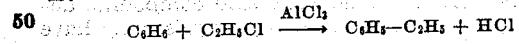

It might also be assumed that the following reaction will occur, but it has not been successfully completed, insofar as we are aware:

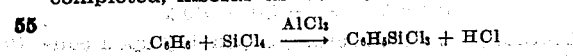

Thus the Friedel-Crafts reaction appears unworkable in this connection, the Wurtz reaction appears impractical from the point of view of many commercial conditions, and the production of normal alkoxy silicanes such as tetra-ethoxy silicane appeared unpromising because of the instability of such products toward hydrolysis. Of the various reactions and products above discussed, the Grignard reaction and the products produced thereby (having a carbon to silicon, —C—Si—, linkage), in spite of the high cost of such reaction, apparently appeared most promising: see Eugene C. Rochow Patents Nos. 2,258,218, 2,258,219, 2,258,220, 2,258,221 and 2,258,222.

We have, however, discovered an important class of organic-silicon compounds which do not have molecules with a carbon to silicon linkage, and furthermore which have a carbon-oxygen-silicon (—C—O—SI—) linkage and yet do not have the short-comings of normal alkyl ortho-silicates, such as ethyl orthosilicates (also referred to as tetra-ethoxy silicane). We have also found that we can produce organic-silicon compounds, e. g. starting with silicon tetrachloride (SiCl$_4$), in which only a portion, e. g. two, of the chlorine atoms are replaced by alkoxy groups. This we have been able to accomplish by employing a tertiary alcohol, e. g. tertiary-butyl alcohol or tertiary-amyl alcohol, for reaction with silicon tetrachloride (under particular conditions which avoid the undesirable production of tertiary-butyl chloride, or the like, plus SiO$_2$). Insofar as we know, no one prior to our invention has ever reacted a tertiary alcohol with silicon tetrachloride; or produced organic silicon compounds such as we have been able to produce. We have furthermore, been able to carry out our operations with good yields (e. g. 80 percent or better) so as to replace two chlorine atoms of the silicon tetrachloride, instead of all four chlorine atoms, as in the making of ethyl orthosilicate, (C$_2$H$_5$O)$_4$Si. By employing different conditions we can also replace either one or three chlorine atoms, as desired.

We have produced various compounds of the type just referred to, including, for example, di-tertiary-butoxy dichloro silicane,

di-tertiary-amoxy dichloro silicane,

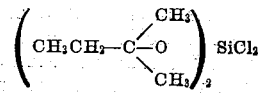

and bis (di-chloro-tertiary-butoxy) dichloro silicane.

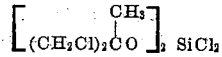

These compounds can be hydrolyzed under controlled alkaline conditions, e. g. in the presence of aqueous ammonia or aqueous pyridine, to remove the chlorine atoms and to yield an alkoxy silicane which latter is resistant to neutral or alkaline hydrolysis. The last mentioned compound may be a di-tertiary-alkoxy di-hydroxy silicane, [(CH$_3$)$_3$CO]$_2$Si(OH)$_2$ or some variation thereof. In some cases said compound, depending on the manner of hydrolysis, may have a molecular formula of generally the following type:

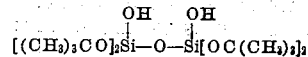

Another possible structure, depending upon conditions of hydrolysis, is

Whatever the exact molecular structure of this compound in any particular case, the compound has the unique characteristic of having alkoxy groups attached to silicon, where the compound itself is resistant to both neutral and alkaline hydrolysis. Compounds of this character, upon heating to moderate temperatures, above the respective melting point of each, will polymerize to form resins which may be controlled to a clear, colorless, water-resistant fusible character.

The term alkoxy silicane is used herein to designate compounds in which at least one of the valences of silicon is taken up by an alkoxy group and the other valences may be satisfied by one or more groups or atoms such as chlorine, oxygen, hydroxyl, amino, alkoxy, alkyl, aryl, etc.

Insofar as we are aware no one prior to our invention ever produced an alkoxy silicane or other organic-silicon compound of any type (e. g. an alkoxy chloro silicane) which could be hydrolyzed to produce a compound having alkoxy groups attached to silicon, which latter compound is resistant to neutral and/or alkaline hydrolysis; neither has there ever been produced, insofar as we are aware, an alkoxy silicane containing one or more other groups or atoms (in addition to the tert-alkoxy group or groups), and which compound is stable to ordinary neutral or alkaline hydrolysis.

Saying somewhat the same thing in other words, insofar as we know no one prior to our invention ever produced an alkoxy chloro silicane in which the chlorines can be removed by hydrolysis, e. g. by alkaline hydrolysis, using an alkaline material, such as ammonia or pyridine, which is soluble both in water and in the alkoxy chloro silicane, where the alkoxy groups are stable, i. e. unaffected by such hydrolysis.

It is an object of our invention to produce alkoxy silicanes, especially tertiary-alkoxy silicanes, of the type above indicated, which can be hydrolyzed to produce the corresponding alkoxy silicanes which are resistant to neutral and/or alkaline hydrolysis. It is also an object of our invention to produce alkoxy silicanes, having one or more other groups attached to silicon in addition to the alkoxy group or groups, which compounds are stable against neutral and alkaline hydrolysis. It is also an object to provide resins, as above indicated, by polymerizing the type of compound last-mentioned. Employing compounds as above indicated, e. g. di-teritary-alkoxy dichloro silicanes, as intermediates and producing other compounds and/or treated articles therefrom, and such resulting compounds and/or treated articles, constitute further objects and advantages hereof. These and other objects and advantages will appear from the description taken as a whole.

Illustrative and advantageous procedures for preparing our tertiary-alkoxy chloro silicanes will now be given. However, it will be understood that our novel products are contemplated irrespective of the particular method of production described.

*Process for the manufacture of di-tert-amoxy dichloro silicane*

Materials to be employed and proportions:

| Material | Weights | Moles |
|---|---|---|
| | Parts | |
| Silicon tetrachloride | 510 | 3.00 |
| Pyridine | 498 | 6.33 |
| Tertiary-amyl alcohol | 528 | 6.00 |
| Benzene (as solvent) | 1,050 | |
| Benzene (for washing C$_5$H$_5$N.HCl) | 1,100 | |

The benzene and silicon tetrachloride are placed in the reaction vessel, preferably glass lined, and cooled to about 10° C. by means of brine or other heat exchange medium. While stirring the solution, the pyridine is slowly added, the temperature being kept below 20° C. during the addition. The addition of the pyridine requires a substantial period of time, e. g. from 1 to 2 hours, depending on the efficiency of the cooling system. Throughout the entire addition the pyridine and silicon tetrachloride react to form a white precipitate which toward the end forms a fairly thick paste with the benzene. The formation of this white precipitate on the walls of the reaction vessel as a result of the interaction of the vapors of the reactants can be reduced to a minimum by having the pyridine inlet extend to within a few inches of the surface of the benzene. After addition of the pyridine is complete the mixture is stirred, e. g. an additional 15 minutes, more or less.

The tert-amyl alcohol is then added, all at once. The temperature rises slowly at first, but once above about 30° C. it rises rather quickly. Unless the dimensions of the reaction vessel are sufficiently restricted, it is desirable to employ internal cooling coils or elements, so that loss of material due to overheating will be avoided. It has been found convenient to allow the temperature to rise to about 40-45° C. then, by controlled cooling, it is kept at this temperature until the reaction subsides. This requires about 1.5 to 2 hours, more or less. The mixture is then heated slowly over a period of about 45 minutes to reflux temperature. The slow heating tends to form a granular pyridine hydrochloride which lends itself well to subsequent filtration. Refluxing is then continued for about two hours, to insure completion of the reaction. It is then cooled and filtered to remove the pyridine hydrochloride, recovering both the filtrate and filter cake. What is ordinarily a very slow filtration can be accomplished quickly by forming a bed of a filter-aid such as "Filter Cel" or "Super Cel" on the filtering medium, such as cloth. This can be done by suspending 15-20 parts of the filter-aid in 200-300 parts of benzene and filtering this suspension through the filtering apparatus. The benzene can be used later for washing purposes. The pyridine hydrochloride is substantially free of filtrate and then washed with benzene until substantially free of the di-tertiary-amoxy dichloro silicane product.

The filtrate and washings are combined and the benzene is distilled off at atmospheric pressure. When there is no further benzene distillate the product is cooled and the distillation continued at reduced pressure, e. g. an absolute pressure of 10 to 100 mm., to separate the di-tertiary-amoxy dichloro silicane product from remaining materials (i. e. products of side reactions, impurities, etc.). The product decomposes when distilled at atmospheric pressure. A glass lined still, suitable for vacuum distillation, may be employed for both the distillation at atmospheric pressure and the subsequent distillation at reduced pressures.

After a small amount of low boiling material (mostly benzene) is removed in the vacuum distillation, the major portion of the product boils at 105° C. at 22 mm. absolute pressure. The distillate is sometimes cloudy with pyridine hydrochloride, but this settles out on standing and has proved to be of no consequence when the product is used in other reactions. About 700 parts by weight (85% of theoretical yield) of di-tert-amoxy dichloro silicane is obtained.

In the preparation of di-tertiary-butoxy dichloro silicane the process is substantially identical with that above described except that 444 parts by weight (6.0 mols) of tertiary-butyl alcohol are used in place of 528 parts of tertiary-amyl alcohol above indicated. The boiling point of the di-tertiary-butoxy dichloro silicane is 66° C. at 11 mm. absolute pressure.

Similarly, dichloro-tert-butyl alcohol, 1-ethylcyclohexanol, dihydroterpineol, terpineol and linalool react with silicon tetrachloride in the presence of pyridine, yielding respectively: bis (dichloro-tert-butoxy) dichloro silicane, B. P. 173-6° C. at 10 mm.; bis (1-ethylcyclohexoxy) dichloro silicane, B. P. 170-3° C. at 5 mm.; bis (dihydroterpineoxy) dichloro silicane, B. P. 195° C. at 7 mm., and diterpineoxy and dilinalooxy dichloro silicanes which latter two compounds could not be distilled without decomposition at 5 mm. pressure. The average yield was about 75-80% of the theoretical in all cases.

*Procedure for making tri-tertiary-butoxy chloro silicane*

One method of making this compound will be briefly described.

A solution of 98.0 parts of di-tert-butoxy dichloro silicane, 31.6 parts of pyridine and 75 parts of tert-butyl alcohol was allowed to stand in a closed container for 72 hours or until the precipitation of pyridine hydrochloride ceased. The mixture was then filtered, the precipitate washed with benzene, and the filtrate fractionally distilled. Tri-tert-butoxy chloro silicane (55 parts) was collected at 76° C. at 7 mm. pressure.

*Process for making tertiary-butoxy trichloro silicane*

In one method of making tert-butoxy trichloro silicane 37 parts of tert-butyl alcohol were added to the reaction product of 39.5 parts pyridine and 85 parts of silicon tetrachloride in 250 parts of solvent. The reaction was carried out in essentially the same manner as described hereinabove for the preparation of di-tert-amoxy dichloro silicane except for the proportions of reactants as indicated. Upon working up the products the yield of tert-butoxy trichloro silicane averaged about 38% of the theoretical in several runs. In these runs variations in time, temperature and solvent seemed to have little effect on the yield of product.

The above procedure was less satisfactory for the making of tertiary-amoxy trichloro silicane. We found, however, that by changing the order of addition of the reactants we got materially improved yields of tertiary-alkoxy trichloro silicanes. This improved procedure will now be described.

*Improved process for the manufacture of tertiary-butoxy trichloro silicane*

This method involves the slow addition of a mixture of 37 parts (0.5 mol) of tertiary-butyl alcohol and 39.5 parts (0.5 mol) of pyridine to a solution of 200 c. c. of petroleum ether (boiling range 35-60° C.) and 85 parts (0.5 mol) of silicon tetrachloride, cooled to about 17° C. The mixture was kept at this temperature during the addition which required five (5) hours and then it was heated to 30° C. over a four (4) hour period. The reaction mixture stood overnight and was then stirred for five (5) hours at 30° C., filtered and the product distilled. 71.5 parts (0.39 mol) of tertiary-butoxy trichloro silicane (B. P. 70° C. at 87 mm.) was obtained, representing a yield of 69% of the theoretical.

This improved method, when applied to the preparation of tertiary-amoxy trichloro silicane (B. P. 78° C. at 55 mm.), resulted in a 79% yield of this compound. This is an outstanding improvement in yield of this compound over that obtained with the procedure first discussed for making tertiary-alkoxy trichloro silicanes.

In respect to proportions of reactants employed in the procedures for making tertiary-alkoxy trichloro silicanes, and comparing them with the hereinabove described procedure for making di-tertiary-alkoxy dichloro silicanes, it will be noted that the difference does not consist in simply lowering the proportion of alcohol to the silicon tetrachloride, but, however unexpected it may seem, it is also very important that the proportion of pyridine to the silicon tetrachloride be lowered, as illustrated by the proportions given in the respective examples.

This was shown by the observation in the above improved process for preparing tertiary-butoxy trichloro silicane, that if double the quantity of pyridine were used (the quantities of other materials and the conditions were otherwise the same) no tertiary-butoxy trichloro silicane was obtained, but instead di-tertiary-butoxy dichloro silicane was produced in a theoretical yield of 87% based on the quantity of alcohol used. In this example approximately half of the silicon tetrachloride did not enter at all into reaction with the tertiary-butyl alcohol.

It will be understood that the hereinabove examples are intended to be illustrative only, and that the invention is generic to the process wherein a tertiary alcohol is caused to react with silicon tetrachloride in the presence of pyridine and/or with the reaction product of pyridine and silicon tetrachloride or with a tertiary-alkoxy trichloro silicane or a di-tertiary-alkoxy dichloro silicane in the presence of pyridine. The groups attached to the carbinol carbon may be aliphatic or aromatic; if aliphatic, they may be saturated or unsaturated, and if cyclic, they can contain a hetero atom such as oxygen in the furan ring or sulfur in the thiophene ring. They can be substituted by additional groups which are unreactive toward silicon tetrachloride such as halogen, nitro, alkoxy, or acetoxy. If aromatic, they can also be substituted with additional groups unreactive toward silicon tetrachloride such as alkyl or any of the groups described above.

The solvent used for the reaction must be substantially inert to reactants and its properties should be such that it can be readily separated from the product. Such solvents include aliphatic or aromatic hydrocarbons, ethers and cyclic ethers, etc., as well as their halogenated derivatives. In some cases it may be desirable to use one of the reactants as a solvent, e. g. pyridine or other tertiary-amine as well as tertiary-butyl alcohol or other tertiary alcohol may be used. However, in general the lower boiling hydrocarbons are preferred because of their low cost, the ease with which the pyridine hydrochloride can be removed from them by filtration, and also the fact that they can be readily separated from the product by distillation.

The order of addition of reactants in many cases (particularly in the preparation of di-tertiary-alkoxy dichloro silicanes) is not a critical point, e. g. di-tertiary-butoxy dichloro silicane may be prepared by the addition of a mixture of tertiary-butyl alcohol and pyridine to silicon tetrachloride in a suitable solvent.

The temperature of the reactions in the hereinabove examples can be varied. Although reaction takes place between silicon tetrachloride and tertiary alcohols in the presence of pyridine at low temperatures it proceeds only slowly below 30° C. The rate increases rapidly as the temperature is increased above about 30° C. and is very fast at the boiling point of benzene. The preferred temperature for the preparation of di-tertiary-alkoxy dichloro silicones is 45±10° C., since in this range of temperatures the rate of reaction is satisfactory and at the same time the reaction can be easily controlled. The amount and time of heating of the reaction mixture after all of the ingredients are present depend largely on the rate of reaction and are not limited to the time and temperature given in the hereinabove examples.

As hereinabove indicated, the alkoxy chloro silicanes described and illustrated hereinabove may advantageously be employed as intermediates in making other materials. A very brief skeleton outline of such derivative materials, prepared by us, is appended hereto as a drawing, to be made a part of this application. It will be understood that this skeleton outline is not intended to be in any way comprehensive, but simply illustrative, and an aid in understanding certain of the products produced in their general relation to each other. It will be noted, for example, that the skeleton outline shown in the appended drawing is all prepared on the basis of compounds derived from tertiary-butyl alcohol with the other reactants. A generally analogous outline could be prepared with compounds derived from tertiary-amyl alcohol and other tertiary alcohols, of which several other illustrations are given hereinabove. It will also be understood that where the compounds di-tertiary-butoxy dichloro silicane or tri-tert-butoxy chloro silicane are shown that we also comprehend compounds which contain unlike alkoxy radicals such as tertiary-butoxy tertiary-amoxy dichloro silicane, tertiary-butoxy tertiary-amoxy dichloro-tertiary-butoxy chloro silicane, etc.

Additional products comprehended herein are those derived by reaction of silicon oxychloride with tertiary alcohols in the presence of pyridine. Silicon oxychloride, $Si_2OCl_6$, is an intermediate in the formation of silicon tetrachloride and undergoes the same general type of reactions as the latter. For example, by reaction of this material with tert-butyl alcohol in various amounts a number of new products may be prepared of which the following are examples:

I. Sym-tetra-tert-butoxy dichloro siloxane.
II. Di-tert-butoxy tetrachloro siloxane.
III. Penta-tert-butoxy chloro siloxane.

Hydrolysis of I with aqueous pyridine yields tetra-tert-butoxy dihydroxy siloxane which latter is also obtained by hydrolysis of di-tert-butoxy dichloro silicane under special conditions. Hydrolysis of II with aqueous pyridine gives a resin, which is quite similar to the hereinbelow described resin obtained by the hydrolysis of di-tert-butoxy dichloro silicane.

Compounds which distinguish over the prior art in a manner parallel to or analogous to the distinctions possessed by the silicon compounds herein illustrated, but which contain a metal of groups III to V of the periodic table other than silicon, for example boron, are likewise contemplated.

Also while organic-chlorine-silicon compounds are particularly illustrated, compounds containing a halogen other than chlorine, for example bromine, are also contemplated.

For the sake of providing a concise summary of various illustrative compounds prepared by us in accordance with the present invention, and various physical constants, data and a brief description of each, but not as a limitation on our invention, reference is made to the following table, in which are also included a few other products in addition to those derived from tertiary alcohols, comprising examples of orthosilicates of a type which can be prepared by the reaction of certain secondary alcohols with silicon tetrachloride in the presence of pyridine:

[The following abbreviations are used in this table: t-BuO—=tertiary-butoxy=(CH₃)₃CO—; t-AmO=tertiary-amoxy=

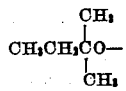

b. p.=boiling point, the pressure being given in millimeters (mm.) of mercury; m. p.=melting point; f. p.=freezing point; $n_D^{20}$=refractive index, and $D^{20}$=density at 20° C. in grams per ml.; Dec.=decomposes.]

| Name | Formula | Physical Constants | Analysis | Appearance |
|---|---|---|---|---|
| tert-Butoxy Trichloro Silicane | t-BuOSiCl₃ | b. p. 70° C./87 mm., D²⁰ 1.176. | Cl 50.5, Theory 51.3 | Limpid liquid; Fumes in moist air. |
| Di-tert-butoxy Dichloro Silicane. | (t-BuO)₂SiCl₂ | b. p. 66° C./11 mm., D²⁰ 1.034 | Cl 28.9, Theory 29.0 | Do. |
| Tri-tert-butoxy chloro Silicane | (t-BuO)₃SiCl | b. p. 75-9° C./5 mm., D²⁰ 0.937. | Cl 11.8, Theory 12.6 | Limpid liquid; Does not fume. |
| tert-Amoxy Trichloro Silicane | t-AmO SiCl₃ | b. p. 80° C./57 mm., D²⁰ 1.166 | Cl 47.5, Theory 48.1 | Limpid liquid; Fumes in moist air. |
| Di-tert-amoxy Dichloro Silicane. | (t-AmO)₂SiCl₂ | b. p. 105° C./22 mm., D²⁰ 1.027. | Cl 25.6, Theory 26.0 | Do. |
| Tri-tert-amoxy Chloro Silicane | (t-AmO)₃SiCl | b. p. 128-30° C./15 mm., D²⁰ 0.924. | Cl 8.0, Theory 10.9 | Limpid liquid; Does not fume. |
| Bis(dichloro-tert-butoxy) Dichloro Silicane. | (Cl₂-t-BuO)₂SiCl₂ | b. p. 173-6° C./10 mm., D²⁰ 0.415. | Active Cl 18.8, Theory 18.5. | Slightly viscous liquid; Fumes. |
| Bis(1-ethyl cyclohexoxy) Dichloro Silicane. | (C₈H₁₅O)₂SiCl₂ | b. p. 170-3° C./5 mm. | Cl 19.5, Theory 20.1 | Do. |
| Diterpineoxy Dichloro Silicane. | (C₁₀H₁₇O)₂SiCl₂ | Decomposes on heating 195° C./7 mm. | Cl 15.9, Theory 17.6 | Do. |
| Bis(dihydro terpineoxy) Dichloro Silicane. | (C₁₀H₁₉O)₂SiCl₂ | | Cl 17.1, Theory 17.5 | Do. |
| Dilinalooxy Dichloro Silicane | (C₁₀H₁₇O)₂SiCl₂ | Decomposes on heating 160-5° C./5 mm., with decomp. | Cl 17.2, Theory 17.6 | Do. |
| Bis(4-Acetoxy-2-methyl-2-pentoxy) Dichloro Silicane. | (C₈H₁₅O₂)₂SiCl₂* | | Cl 15.4, Theory 17.1 | Do. |
| Di-tert-butoxy tetrachloro siloxane. | t-BuO Si(Cl)(Cl)—OSi(Cl)(Cl) t-BuO | b. p. 100-115° C./22 mm. | Cl 38.3, Theory 39.9 | Limpid liquid. |
| Tetra-tert-butoxy dichloro siloxane. | (t-BuO)₂SiOSi(t-BuO)₂ with Cl Cl | b. p. 145-55° C./25 mm. | Cl 15.6%, Theory 16.3%. | Do. |
| Penta-tert-butoxy chloro siloxane. | (t-BuO)₃SiOSi(t-BuO)₂ with Cl | b. p. 155-60° C./20 mm. | Cl 8.8, Theory 7.5 | Do. |
| Di-tert-butoxy Dihydroxy Silicane. | (t-BuO)₂Si(OH)₂* | b. p. 210° C. Dec., m. p. 104-5° C. | SiO₂ 29.12, Theory 28.85. | White crystals. |
| Tri-tert-butoxy Hydroxy Silicane. | (t-BuO)₃SiOH* | b. p. 205-10° C., m. p. 66-7° C. | SiO₂ 23.2, Theory 22.7 | Do. |
| Tetra-tert-butoxy dihydroxy Siloxane. | (t-BuO)₂SiOSi(BuO)₂ with OH OH | m. p. 80-82° C. | SiO₂ 30.4, Theory 30.2 | Do. |
| Di-tert-amoxy Dihydroxy Silicane. | (t-AmO)₂Si(OH)₂* | b. p. 160-70/30 mm., m. p. 97-98° C. | SiO₂ 25.7, Theory 25.4 | Do. |
| Tri-tert-amoxy Hydroxy Silicane. | (t-AmO)₃SiOH* | b. p. 150-5° C./35 mm., $n_D^{20}$ 1.4200. | SiO₂ 19.4, Theory 19.6 | Limpid liquid. |
| Tri-ethyl tert-amyl Silicate | (t-AmOSi(OC₂H₅)₃ | b. p. 195-205° C | SiO₂ 24.0, Theory 24.0 | Do. |
| Di-tert-butyl Diallyl Silicate | (t-BuO)₂Si(OCH₂CH=CH₂)₂ | b. p. 98-108° C./11 mm | SiO₂ 20.8, Theory 20.8 | Do. |
| Di-tert-amyl Diallyl Silicate | (t-AmO)₂Si(OCH₂CH=CH₂)₂ | b. p. 139° C./23 mm., $n_D^{20}$ 1.4240, D²⁰ 0.921. | SiO₂ 18.8, Theory 19.0 | Do. |
| Di-tert-amyl Di-n-propyl Silicate. | (t-AmO)₂Si(OCH₂CH₂CH₃)₂ | b. p. 135-6° C./25 mm., $n_D^{20}$ 1.4133, D²⁰ 0.908. | SiO₂ 18.6, Theory 18.8 | Do. |
| Di-tert-butyl (2-methyl-2,4-pentanediol) Silicate. | (t-BuO)₂Si(C₆H₁₂O₂) | b. p. 100-5° C./15 mm., $n_D^{20}$ 1.4151. | | Slightly viscous liquid. |
| Di-tert-butyl (2-ethyl-2-nitro-1,3-propanediol) Silicate. | (t-BuO)₂Si(C₅H₉O₄N) | b. p. 170° C./15 mm., f. p. 55° C. | SiO₂ 18.8, Theory 18.7 | White crystals. |
| Di-tert-butyl (diethylene-glycol) Silicate. | (t-BuO)₂Si(C₄H₈O₃)* | Gels at 320° C., $n_D^{20}$ 1.4282 | SiO₂ 22.0, Theory 21.6 | Viscous liquid. |
| Di-tert-butyl (dipropylene-glycol) Silicate. | (t-BuO)₂Si(C₆H₁₄O₃)* | Forms gel at 340° C | SiO₂ 20, Theory 19.6 | Do. |
| Di-tert-butyl (Tetraethyleneglycol) Silicate. | (t-BuO)₂Si(C₈H₁₆O₅)* | Gel | | Resembles "Art Gum." Gel. |
| Di-tert-butyl (nonaethyleneglycol) Silicate. | (t-BuO)₂Si(C₁₈H₃₆O₁₀)* | | | |
| Di-tert-amyl (diethylene glycol) Silicate. | (t-AmO)₂Si(C₄H₈O₃)* | Gels at 345° C., $n_D^{20}$ 1.4280 | | Viscous liquid. |
| Di-tert-amyl (2-methyl-2,4-pentanediol) Silicate. | (t-AmO)₂Si(C₆H₁₂O₂) | b. p. 138-45° C./29 mm., $n_D^{20}$ 1.4241. | | Slightly viscous liquid. |
| Di-tert-butoxy Diamino Silicane. | (t-BuO)₂Si(NH₂)₂ | b. p. 95° C./30 mm., $n_D^{20}$ 1.4201. | N 13.0, Theory 13.6 | Do. |
| Di-tert-amoxy Diamino Silicane. | (t-AmO)₂Si(NH₂)₂ | b. p. 188° C./20 mm., $n_D^{20}$ 1.4300. | N 10.1, Theory 11.9 | Do. |
| Di-tert-butoxy Dianilino Silicane. | (t-BuO)₂Si(NHC₆H₅)₂ | b. p. 198° C./7 mm., f. p. 75° C | SiO₂ 16.8, Theory 16.7 | White crystals. |
| Di-tert-butoxy Chloro Anilino Silicane. | (t-BuO)₂Si(NHC₆H₅*)(Cl) | b. p. 135-50° C./7 mm. | SiO₂ 20.0, Theory 19.8 | Viscous liquid. |

| Name | Formula | Physical Constants | Analysis | Appearance |
|---|---|---|---|---|
| Di-tert-butoxy Diacetoxy Silicane. | $(t\text{-}BuO)_2Si(OOCCH_3)_2$ | b. p. 100° C./7 mm., $n_D^{20}$ 1.4043. | Acid No. 374, Calc. 384 | Limpid liquid. |
| Dimethyl Dilinaloyl Silicate | $(CH_3O)_2Si(C_{10}H_{17}O)_2$ | b. p. 177–8° C./7 mm | $SiO_2$ 15.0, Theory 15.2 | Slightly viscous liquid |
| Diethyl Diterpinyl Silicate | $(CH_3CH_2O)Si(C_{10}H_{17}O)_2$ | b. p. 193–200° C./6 mm., $n_D^{20}$ 1.4703. | $SiO_2$ 14.2, Theory 14.1 | Do. |
| Bis(4-acetoxy-2-methyl-2-pentoxy) Dimethoxy Silicane. | $(CH_3O)_2Si(C_8H_{15}O_3)_2$* | b. p. 163–6° C./5 mm., $n_D^{20}$ 1.4262. | $SiO^2$ 14.8, Theory 14.7 | Do. |
| Bis(triphenyl methyl) Dimethyl Silicate. | $(CH_3O)_2Si[OC(C_6H_5)_3]_2$* | b. p. 205–8° C./5 mm | $SiO_2$ 10.7, Theory 9.9 | Do. |
| Bis(2-methyl-2,4-pentanediol) Silicate. | $(C_6H_{12}O_2)_2Si$ | b. p. 105–110° C./9 mm., f. p. 60° C. | $SiO_2$ 23.04, Theory 23.07. | White crystals. |
| Isopropyl orthosilicate | $[(CH_3)_2CHO]_4Si$ | b. p. 59° C./4 mm., $n_D^{20}$ 1.3855. | $SiO_2$ 20.8, Theory 20.8 | Limpid liquid. |
| Di-sec-butoxy-dichloro Silicane | $(CH_3CH_2\overset{CH_3}{\underset{\|}{C}HO})_2SiCl_2$ | b. p. 93–95° C./22 mm | Cl 26, Theory 29 | Fuming liquid. |

In the above table where an asterisk occurs beside the indicated formula of a compound, this has been done because we do not feel that we have sufficient evidence as yet to be sure that this is necessarily the correct formula. In the case of some of the formulae given it is to be understood that the actual molecular weight may be represented by that indicated by the formula, when multiplied by some integral number in excess of 1; that is the compound itself is a polymer in certain cases. In respect to some of the compounds, because of the complexity of their formulae, it is doubtful whether it will ever be possible to accurately prove their chemical structure; however, it is believed to be helpful to indicate what their structure probably is, based upon such data as we have, and in any event there is considerable certainty about certain characteristics of the molecule, or functional groups, which is the important thing in determining the reactivity, stability under various conditions and like characteristics of the product.

In the making of various derivative products from tertiary-alkoxy chloro silicanes, for example as indicated in the attached drawing, and also in the table presented hereinabove, it is important to note that in many cases purification of the tertiary-alkoxy chloro silicane is not necessary and that the derivative may be made directly, often even in the same reaction vessel, with the crude tertiary-alkoxy chloro silicane. To illustrate, the crude di-tertiary-butoxy dichloro silicane (which is made up of about 85% di-tertiary-butoxy dichloro silicane) may be reacted directly with allyl alcohol and pyridine to produce di-tertiary-butyl diallyl silicate (about 73% yield); or with acetic acid and pyridine to produce di-tertiary-butoxy diacetoxy silicane (76% yield); or with diethylene glycol and pyridine to produce di-tertiary-butyl (diethylene glycol) silicate (90% yield); etc., the ultimate product in each case may then be purified as desired.

As already indicated, one of the important uses of alkoxy chloro silicanes is as intermediates in the production of other products or as reactants or treating agents in the production of improved articles. Procedures involving such use of tertiary-alkoxy chloro silicanes, and the ultimate products resulting therefrom will now be described briefly.

*Production of a resin from di-tertiary-butoxy dichloro silicane*

When dialkoxy dichloro silicanes and/or alkoxy trichloro silicanes are hydrolyzed in the presence of an acid acceptor, and the hydrolysis products therefrom are further heated, the end-products obtained are of a resinous nature. Various methods can be employed for the production of these resinous materials. For example, a crude di-tert-alkoxy dichloro silicane may be hydrolyzed directly in the original reaction mixture with no preliminary purification of this mixture. This may be accomplished by adding to the crude reaction mixture the required amount of a basic material, such as sodium carbonate dissolved in water. The organic layer is then separated, the solvent removed by distillation and the product heated until the desired degree of hardness is attained.

However, the use of a di-tert-alkoxy dichloro silicane which has been previously purified by distillation is preferred because of the improved control over the purity and properties of the final resin. The following example will serve to illustrate a preferred procedure for the preparation of a resin from di-tert-amoxy dichloro silicane.

In a suitable reaction vessel is placed 150 parts of concentrated aqueous ammonia. The ammonia solution is cooled to 15–20° C. and with good agitation 68 parts of distilled di-tert-amoxy dichloro silicane, B. P. 105° C./22 mm., is gradually added over a 30 minute period keeping the temperature at 15–20° C. Agitation is continued for 15 minutes. The layers which have formed are separated and the aqueous layer extracted with benzene, which is then added to the oil layer.

The benzene solution of the product is filtered to remove traces of solid impurities. The filtrate is then distilled at atmospheric pressure until all of the benzene is removed. The product is then heated, the time and temperature of the heating being determined by the properties desired in the final resinous product, which may vary from a viscous oil through a soft, tacky resin to a hard and brittle resin which may be either fusible or infusible. For example, the product of the above reaction was heated at atmospheric pressure at 245–55° C. for 30 minutes and then at the same temperature at 30 mm. pressure for 1 hour. At the end of this treatment the product (37.4 parts) was still fluid before cooling, but at room temperature it was a clear, almost colorless, hard and brittle resin. Analysis of this sample gave a value for silicon of 18.5%.

The conditions of time and temperature in the hydrolysis of the di-tert-amoxy dichloro silicane may be varied greatly from those indicated in the preceding example. For example, such a hydrolysis has been successfully carried out at 70° C. The time in any case need only be sufficient to assure completion of the hydrolysis which occurs much more rapidly as the temperature is increased.

Resins of the type hereinabove indicated may also be prepared by an indirect procedure involving the conversion of a di-tert-alkoxy dichloro silicane to a di-tert-alkoxy diamino silicane by reaction of the former with anhydrous ammonia. The di-tert-alkoxy diamino silicane may be hydrolyzed by water alone, the product is then separated and heated as in the preceding example.

Tert-alkoxy trichloro silicanes are even more readily converted to resins than the di-tert-alkoxy dichloro silicanes. For example, water is gradually added to a cooled pyridine solution of tert-butoxy trichloro silicane to hydrolyze the latter. The product is extracted from the aqueous layer by means of a suitable solvent such as benzene. Evaporation of the solvent leaves a clear, colorless, brittle resin which is similar to the more brittle of the resins derived from the di-tert-alkoxy dichloro silicanes. Other generally parallel reactions and parallel types of products may be prepared by starting with a different specific tertiary-alkoxy chloro silicane, and a whole series of such resins may be produced by employing different alkoxy chloro silicanes. This is somewhat indicated in the skeleton outline shown in the attached drawing and is further indicated by the other particular tertiary-alkoxy chloro silicanes shown in the table presented above.

These resins, when produced under moderate heating conditions are thermoplastic and are soluble in common organic solvents, e. g. benzene, ethyl alcohol, petroleum ether, etc. However upon long heating these resins ultimately become infusible and also insoluble. The resins are insoluble in and unaffected by water whether in the thermoplastic or the infusible state.

The tertiary-alkoxy chloro silicanes may also be employed as intermediates in producing various orthosilicates by reaction with alcohols, glycols and the like. Illustrations of orthosilicates and their production are indicated in the outline appearing in the appended drawing; they include di-tertiary-butyl diallyl silicate; di-tert-butyl (2-ethyl-2-nitro-1,3 propanediol) silicate; di-tert-butyl (diethylene glycol) silicate and di-tert-butyl (2-methyl-2,4-pentanediol) silicate. In making orthosilicates, such as those just illustrated, and others of this general type, the appropriate alcohol or glycol, as the case may be, is added to a mixture of the alkoxy chloro silicane in the presence of excess pyridine, the reactant mixture being diluted with a suitable solvent such as benzene to provide a reaction mixture which can be readily agitated.

These compounds show an unexpected stability toward the action of water, whereas ethyl orthosilicate is very susceptible to hydrolysis even by the moisture vapor of the atmosphere. When ethyl orthosilicate is placed in direct contact with water it begins to gel almost immediately and after a short time it is completely hydrolyzed to silica. However, in the novel organic-silicon compounds herein described which contain a group derived from a tertiary alcohol, the resulting compound is remarkably stable toward such hydrolysis. For example, a sample of triethyl tert-amyl silicate was not noticeably affected after direct contact with water for a period of over four months. It also remained unchanged after 6 hours heating and rapid stirring at 90° C. with 15% aqueous ammonia. As an additional example of the stability of such compounds toward alkaline hydrolysis, we have found that di-n-propyl di-tert-amyl silicate after three hours refluxing with 20% aqueous sodium hydroxide is less than 15% hydrolyzed.

The products hereinabove described may be fluid or viscous liquids, crystalline solids, or resins which may be soft and sticky or hard and brittle. The liquids and crystalline solids hereinabove described and derived from the tert-alkoxy chloro silicanes are useful as plasticizing agents for natural and/or synthetic resins such as cellulose esters and ethers or the silicon resins herein described. They may be used alone or in admixture with other plasticizers known to those familiar with the art. They may be used as ingredients in extreme pressure lubricants and are also applicable as paint media or as ingredients in waxes and polishes. The resinous products derived from tert-alkoxy chloro silicanes are useful as waterproof coatings for wood, metal, paper, etc., either alone or modified with plasticizers or other plastics. They are also useful as ingredients in adhesives, paints and lacquers.

Di-tertiary-butoxy diacetoxy silicane and analogous compounds may be made in generally the same manner as is indicated in connection with the orthosilicates except that the appropriate organic acid is employed along with the tertiary-alkoxy chloro silicane and pyridine. As an alternative method, these products may be prepared by the reaction of an alkoxy chloro silicane with a salt of the organic acid, e. g. sodium acetate.

Other somewhat analogous compounds, which may be termed as amino or substituted amino silicanes, include such materials as di-tertiary-butoxy diamino silicane and di-tertiary-butoxy dianilino silicane, both of which are shown in the accompanying drawing. The former may be made by adding anhydrous ammonia to di-tertiary-butoxy dichloro silicane employing an organic solvent such as benzene as a diluent. The ammonia removes and replaces the chlorine atoms in the di-tertiary-butoxy dichloro silicane molecule.

The procedure for making and the type of reaction involved in making di-tertiary-butoxy dianilino silicane is analogous to that for the product just discussed, except that aniline is employed as the reactant with di-tertiary-butoxy dichloro silicane. It will be understood that by using the same tertiary-alkoxy chloro silicane and other amines or ammonia derivatives, various other derivative products are made in accordance with our invention. It will also be understood that by using specifically different tertiary-alkoxy chloro silicanes and by using the same or different amines, ammonia or ammonia derivatives, further derivative products may be produced and are likewise comprehended.

Another illustration of the use of tertiary-alkoxy chloro silicanes in the production of useful derivative products and procedure for producing the same is illustrated by the following:

*Process for the manufacture of silicon alkyd-type resins*

To a solution of 9 parts of pyridine in 20 parts of linseed monoglyceride was added 15 parts of di-tert-amoxy dichloro silicane over a period of 20 minutes. The temperature rose to 54° C. during the reaction. 50 parts of benzene was added and the mixture refluxed 2 hours after which it was cooled, filtered and washed three times with 50 parts of water. The benzene was then distilled off and the viscous product heated to 150° C. for 1 hour in an atmosphere of nitrogen. The yield of product was 22 parts.

Flowouts of this product about 0.0015 inch thick on glass were baked at 150° C. for 1 hour. The resulting film was light yellow, hard, transparent and showed good adherence to the glass. It was about 0.001 inch thick. It showed no indication of exuding, but water caused it to blush. However, upon drying it regained its transparency.

A similar, but somewhat softer film was prepared by using an equal amount of di-tert-butoxy dichloro silicane in place of the tertiary-amyl compound in the above reaction. It was also found that the hardness of the resulting film could be appreciably increased by substituting tert-butoxy trichlorosilicane for one-third of the di-tert-butoxy dichloro silicane.

It is evident that many changes can be made on the process as given in the above example such as quantities of reactants, time and temperature of reaction etc., without departing from the spirit of the invention.

The above products resemble the familiar linseed modified polyhydric alcohol-polybasic acid alkyds and can be substituted in many instances where the latter are used.

Another illustrative use of the tertiary-alkoxy chloro silicanes is exemplified by its use in treating cotton fabrics to give them new and improved characteristics, including particularly water repellency. There follows a description of such procedure:

*Treatment of cloth with tertiary-alkoxy chloro silicanes*

Cotton muslin cloth was immersed in a solution of 100 parts of di-tertiary-amoxy dichloro silicane in 800 parts of pyridine for a period of 20 minutes to 1 hour at a temperature preferably of the order of 80–100° C., with suitable agitation. The cloth was then washed thoroughly to remove the pyridine and unreacted di-tertiary-amoxy dichloro silicane. The di-tertiary-amoxy dichloro silicane apparently formed a chemical product with the cellulose which constitutes the essential material of the cloth, by reacting with the hydroxyl groups of the cellulose molecule, and apparently producing compounds which may be regarded as orthosilicates or analogous thereto.

In addition to the above preferred procedure, similar cloth was treated for different lengths of time at 80° C. and the comparative results of these different time conditions of treatment are shown in the table hereinafter. Included also is the per cent ash of samples of the fabric.

The water repellency of the treated fabric in each case was evaluated by the immersion test described by Slowinske, Amer. Dyestuff Reporter 30, 6 (1941). This involved the immersion of a 3" by 3" weighed, air dried sample in water at 80° F. for 20 minutes. The sample was then placed between blotters, run through a wringer once and weighed. The increase in weight, representing the water absorption, is given in per cent in the following table. The values are the average of two determination.

TABLE SHOWING COMPARATIVE RESULTS ON CLOTH TREATMENT
[Time of treatment in minutes at 80° C.]

| Temp | 0 | 10 | 20 | 30 | 40 | 60 | 90 |
|---|---|---|---|---|---|---|---|
| Per Cent Moisture absorption | 70 | 65 | 53 | 51 | 34 | 30 | 32 |
| Per Cent Ash | 0.8 | 1.91 | 2.35 | 2.70 | 2.93 | 3.40 | 3.50 |

Hereinabove we have described and illustrated alkoxy chloro silicanes having important novel and useful characteristics. Various other compounds of the same general type, even if not specifically mentioned herein, are likewise comprehended by this disclosure. In describing derivative products and articles which can be made from the novel alkoxy chloro silicanes herein referred to, it will be evident that we have also been obliged to resort to specific illustrations which, of necessity, must be restricted in number. However it will also be clear in this respect that various other derivative products and articles will readily occur to those skilled in the art in the light of the illustrations and the disclosure given herein. In short it will be understood that the various illustrations given herein are exemplary only of the broader and more comprehensive phases of this invention and are not to be regarded as limitative. All embodiments within the scope of this disclosure and/or of the appended claim, which distinguish over the prior art, are contemplated.

What we claim is:
Di-tertiary amoxy dichloro silicane.

GEORGE WESLEY PEDLOW, JR.
CARL SHELLEY MINER, JR.

REFERENCES CITED

The following references are of record in the file of this patent:

UNITED STATES PATENTS

| Number | Name | Date |
|---|---|---|
| 1,918,338 | Kaufmann | July 18, 1933 |
| 1,932,255 | Sherrand et al. | Oct. 24, 1933 |
| 2,053,474 | Graves | Sept. 8, 1936 |
| 2,097,348 | Shipp | Oct. 26, 1937 |
| 2,150,507 | Kropa | Mar. 14, 1939 |
| 2,197,462 | Bent | Apr. 16, 1940 |
| 2,405,988 | Barry | Aug. 20, 1946 |
| 2,438,736 | Barry | Mar. 30, 1948 |

FOREIGN PATENTS

| Number | Country | Date |
|---|---|---|
| 160,684 | Switzerland | June 1, 1933 |

OTHER REFERENCES

Uchida: "Chemical Abstracts," vol. 27, page 3464 (1933).

Kalinin: "Chemical Abstracts," vol. 35, page 2470 (1941).

Volnov: "Chemical Abstracts," vol. 34, page 5048 (1940).

Beilstein: "Handbuch der Org. Chem.," vol. I, 4th ed., pages 334–335.

Kalinin: "Chemical Abstracts," vol. 32, page 6227 (1938).

Backer: "Rec. Trav. Chim. des Pays Bas," vol. 61, pages 500–512 (published June 1942).

Hackh: "Chemical Dictionary," 3rd ed. (1944), page 33, Blakerton Co., publishers.

Karrer: "Organic Chemistry," 3rd Eng. ed. (1947) page 23, Elsevier, publishers.

Chemical Abstracts, 1945, pages 5882, 5877.

Merriam-Webster's International Dictionary, Unabridged, 2nd edition, (1939), page 67.